United States Patent [19]

Shigeki et al.

[11] Patent Number: 4,998,692
[45] Date of Patent: Mar. 12, 1991

[54] HOSE FITTING FIXING CONSTRUCTION

[75] Inventors: Terumitsu Shigeki, Nagoya; Satoshi Mizutani, Kuwana, both of Japan

[73] Assignee: Toyoda Gosei Co., Ltd., Nishikasugai, Japan

[21] Appl. No.: 302,266

[22] Filed: Jan. 27, 1989

[30] Foreign Application Priority Data

Feb. 10, 1988 [JP] Japan .................................. 63-29684
Apr. 4, 1988 [JP] Japan .................................. 63-45371

[51] Int. Cl.$^5$ ............................................. F16L 3/00
[52] U.S. Cl. ..................................... 248/56; 248/27.3; 248/75
[58] Field of Search ................ 248/56, 79, 57, 58, 248/73, 74.1, 75; 285/61, 62, 158, 161; 174/65 R, 65 G

[56] References Cited

U.S. PATENT DOCUMENTS

| 2,365,785 | 12/1944 | Tinnerman | 248/56 |
| 2,744,185 | 5/1956 | Cawley | 248/27.3 X |
| 4,346,863 | 8/1982 | Zeitrager et al. | 248/56 X |
| 4,458,552 | 7/1984 | Spease et al. | 248/56 X |
| 4,601,448 | 7/1986 | Miyazaki et al. | 248/56 |
| 4,735,534 | 4/1988 | Oehlke | 248/56 X |

FOREIGN PATENT DOCUMENTS 59-6310 2/1984 Japan .
60-178690 11/1985 Japan .

Primary Examiner—Karen J. Chotkowski
Attorney, Agent, or Firm—Cushman, Darby & Cushman

[57] ABSTRACT

In a hose fitting fixing construction of the present invention, at least one of a hose fitting and a bracket has at least one stopper having a stopper surface brought into contact with the other part and being substantially parallel to a plane which contains a fixing point of a fixing device and the central axis of a sleeve of the hose fitting. The stopper prevents the hose fitting from moving on a surface of the bracket. Accordingly, the hose fitting fixing construction offers an excellent positioning accuracy when installing a hose assembly, and prevents the hose fitting from moving on the surface of the bracket even during service. In addition, it is possible to install the hose assembly to a mounting portion more easily than installing the hose assembly with the prior art hose fitting fixing construction, and obtain excellent work efficiency in a limited work space.

14 Claims, 6 Drawing Sheets

HOSE FITTING FIXING CONSTRUCTION

BACKGROUND OF THE INVENTION

1. Field of the Invention

This invention relates to a hose fitting fixing construction for piping. A hose fitting fixing construction of the present invention may be employed when installing a brake hose assembly to an automobile body. For example, the hose fitting fixing construction may be applied to prevent the brake hose assembly from loosening or contacting with other parts of the automobile.

2. Description of the Prior Art

A hose retainer using a pair of female threaded and male threaded fittings has been known as a hose intermediate retainer for holding an intermediate portion of a hose. However, the hose retainer requires a number of parts and results in a high cost.

Thereupon, another intermediate retainer comprising a flange, a securing portion and a tubular portion has been disclosed in Japanese Examined Utility Model Publication (KOKOKU) No. 6310/1984. In this intermediate retainer, the tubular portion is inserted into a through hole of a mounting bracket extending from an automobile body, secured and positioned with the flange, and then the mounting bracket is held between the flange and a spring clip holding the securing portion. It is possible to solve the above problems with this intermediate retainer, however, it is hard in a limited work space to insert the intermediate retainer with a hose fixed into the through hole of the mounting bracket.

Therefore, as an actual fixing construction, a hose fitting fixing construction disclosed in Japanese Unexamined Utility Model Publication (KOKAI) No. 178690/1985 has been used often. As shown in FIG. 12, this hose fitting fixing construction comprises a hose fitting 100 having tubular sleeves 101, 101 into which hoses 400, 400 are inserted and a plate flange 102 extending from an outer peripheral surface of the hose fitting 100 in a radial direction, a plate bracket 200 extending from a mounting portion, a bolt 300 and a nut 301, thereby overlapping and fixing the bracket 200 and the flange 102 with the bolt 300 and nut 301. This hose fitting fixing construction is excellent in work efficiency in a limited work space.

However, in the hose fitting fixing construction disclosed in Japanese Unexamined Utility Model Publication (KOKAI) No. 178690/1985, the flange 102 is liable to rotate around the axis of the bolt 300 on the surface of the bracket 200 (namely, in a direction vertical to FIG. 12). Accordingly, it is hard to accurately position the hose assembly, comprising the hose fitting fixing 100 and two hoses 400, 400, with respect to a mounting position and the hose assembly is liable to come in contact with other parts. Further, the hose assembly is liable to move gradually due to vibration or the like during service. Furthermore, it takes longer to install the hose assembly to the automobile body because no guide for align the bolt holes of the bracket and flange is provided in this hole fitting fixing construction.

Moreover, another conventional hose fitting fixing construction is shown in FIGS. 13 and 14. This hose fitting fixing construction comprises a rubber tube 600 into which a hose 500 is inserted, a clip 700 for holding the rubber tube 600, and a bolt 900 which is inserted into holes 701, 702 of the clip 700 and is screwed in a threaded hole (not shown) of a mounting portion 800.

The clip 700 is installed to the mounting portion 800 with the bolt 900 screwed in the threaded hole and is firmly joined to the rubber tube 600 and the hose 500.

However, in this conventional hose fitting fixing construction, similarly to the hose fitting fixing construction disclosed in Japanese Unexamined Utility Model Publication (KOKAI) No. 178690/1985, the hose 500 is liable to move when the fastening with the bolt 900 is insufficient, or the bolt 900 loosens due to vibration of the mounting portion 800 or the like. Further, it is not easy to accurately re-position the hose 500 at the appropriate position after disassembling the hose 500 from the mounting portion 800 by untightening the bolt 900.

SUMMARY OF THE INVENTION

It is an object of the present invention to provide a hose fitting fixing construction which offers excellent work efficiency in a limited work space and can prevent a hose assembly from rotating.

It is a further object of the present invention to provide a hose fitting fixing construction which has a guide for accurately positioning a bracket and a hose assembly.

It is a further object of the present invention to provide a hose fitting fixing construction which can position a hose fitting easily and accurately by providing a flange to a hose fitting and by providing a stopper to at least one of the bracket and the flange.

It is a further object of the present invention to provide a hose fitting fixing construction in which the above-mentioned stopper is formed in at lest one of the bracket and the flange simultaneously with the manufacturing of the bracket and the flange and without increasing the number of manufacturing processes.

The hose fitting fixing construction of the present invention comprises a hose fitting comprising a tubular sleeve into which a hose is inserted and a plate flange extending from an outer peripheral surface of the sleeve in a radial direction of the sleeve, a plate bracket extending from a mounting portion, and a fixing means for fixing the flange and the bracket in an overlapped state, wherein at least one of the hose fitting and the bracket has at least one stopper having a first stopper surface brought into contact with the other part and being substantially parallel to a plane which contains a fixing point of the fixing means and the central axis of the sleeve of the hose fitting for preventing the hose fitting from moving on a surface of the bracket.

BRIEF DESCRIPTION OF THE DRAWINGS

A more complete appreciation of the present invention and many of the attendant features of preferred embodiments thereof will be readily obtained as the same becomes better understood by reference to the following detailed description when considered in connection with accompanying drawings wherein.

DETAILED DESCRIPTION OF THE INVENTION

Figure 12:
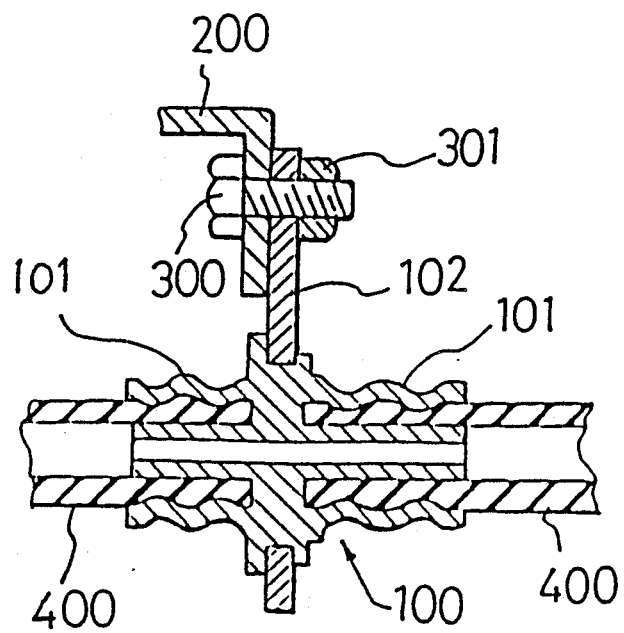
FIG. 12 is a sectional view of a conventional hose fitting fixing construction.
Figure 13:
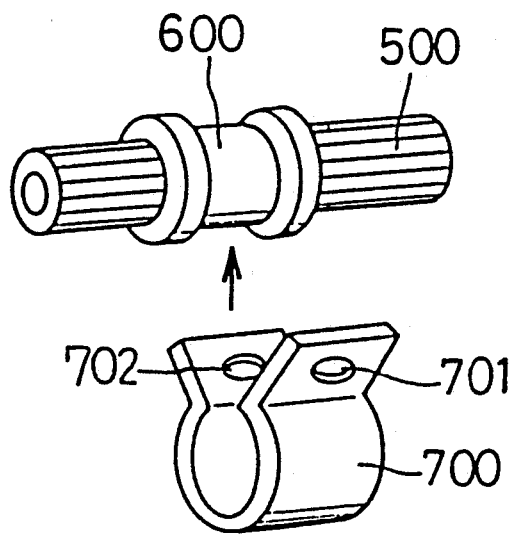
FIG. 13 is a perspective view illustrating another conventional hose fitting fixing construction.
Figure 14:
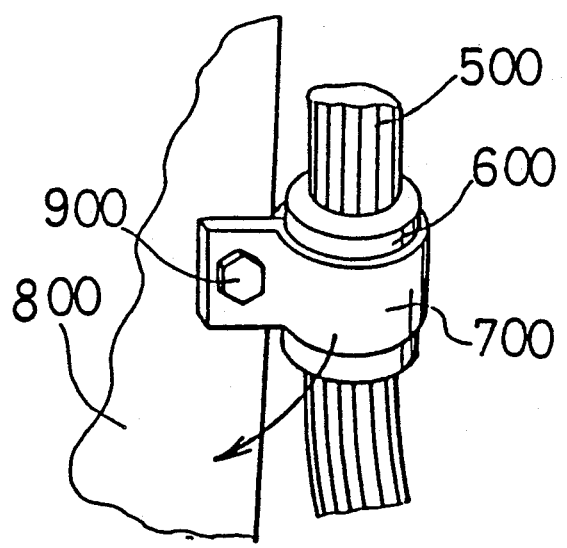
FIG. 14 is a perspective view illustrating an assembly of the hose fitting fixing construction illustrated in FIG. 13.

A hose fitting fixing construction of the present invention comprises a hose fitting, a bracket and a fixing means. The hose fitting comprises a sleeve and a flange. A hose is inserted into the sleeve and fixed in the sleeve by crimping or bonding. Further, an inner cylinder may be inserted into the hose, and the hose may be held and fixed between the inner cylinder and the sleeve. The inner cylinder may be formed integrally with the hose fitting, or may be formed separately. Furthermore, the sleeve may be provided at one side of the flange, or at both sides of the flange. Namely, the hose fitting fixing construction of the present invention is applicable to an end fitting used at a hose end, or an intermediate retainer used for retaining two hoses as shown in FIG. 12. Moreover, a material for each part of the hose fitting fixing construction, the presence of the inner cylinder, and the number of flanges are not specified in particular. Namely, one or more sleeves may be provided, and the sleeve may not have the smooth cylindrical cross section but have an irregular cross-section.

The fixing means may be conventional one comprising a bolt and a nut.

The best feature of the present invention is that at least one of the hose fitting and the bracket has a stopper. The form of the stopper is not particularly specified a far as the stopper has a first stopper surface brought into contact with the other part which does not have the stopper, and as far as the first stopper surface is substantially parallel to a plane containing a fixing point of the fixing means and the central axis of the sleeve of the hose fitting, and as far as the first stopper surface prevents the hose fitting from moving on a surface of the bracket.

For example, the stopper may extend from the bracket and contact with one side surface of the flange or both side surfaces of the flange. Further, the stopper may extend from the flange and contact with one side surface of the bracket or both side surfaces of bracket. Furthermore, the stopper may be a leg portion which extends from an end of the bracket and which forms a cut-off having a width approximately equal to the outer diameter of the sleeve.

Moreover, the stopper may comprise a leg portion which extends from an end of the bracket and which forms a cut-off having an opening at one end and having a width smaller than the outer diameter of the sleeve and approximately equal to the outer diameter of the hose, and a sleeve holding hole provided at the other end of the cut-off and having an inner diameter approximately equal to the outer diameter of the sleeve. When inserting the sleeve of the hose fitting into the sleeve holding hole of the stopper, first the hose is inserted into the sleeve holding hole while guided in the cut-off. Then, the hose is moved in its longitudinal direction to engage the sleeve of the hose fitting with the sleeve holding hole. Thus, it is possible to securely position the hose fitting with respect to the bracket with ease. In addition, the hose fitting hardly gets rickety in the bracket when the fixing means has loosened.

There arises an overload due to icing on the hose during service. In such a case, the flange might be deformed at a portion fixed with the fixing means by stress concentrating on the portion. Accordingly, in the hose fitting fixing construction of the present invention, it is preferred to provide the stopper with a holding portion projecting from at least one of the bracket and the flange to the other part and going around side surfaces and an opposite surface of the other part. The holding portion prevents the hose fitting from moving in the axial direction of the sleeve, thereby preventing the above-mentioned problem.

In accordance with the hose fitting fixing construction of the present invention, a good positioning accuracy has been achieved, and the hose fitting has been securely prevented from moving on the surface of the bracket during service.

Further, the hose fitting fixing construction facilitates hose assembly installation, and offers excellent work efficiency in a limited work space.

Furthermore, the stopper surface of the stopper provided on at least one of the bracket and the flange works to guide the other part during the hose assembly installation. Accordingly, when employing a bolt and a nut for the fixing means, the bolt hole of the bracket and the flange can be aligned with ease only by guiding the bracket and the flange along the stopper.

DETAILED DESCRIPTION OF THE PREFERRED EMBODIMENTS

A hose fitting fixing construction according to the present invention will be hereinafter explained with reference to preferred embodiments. In each preferred embodiment, like parts and like portions performing like functions are designated at like numbers for convenience.

First Preferred Embodiment

Figure 1:
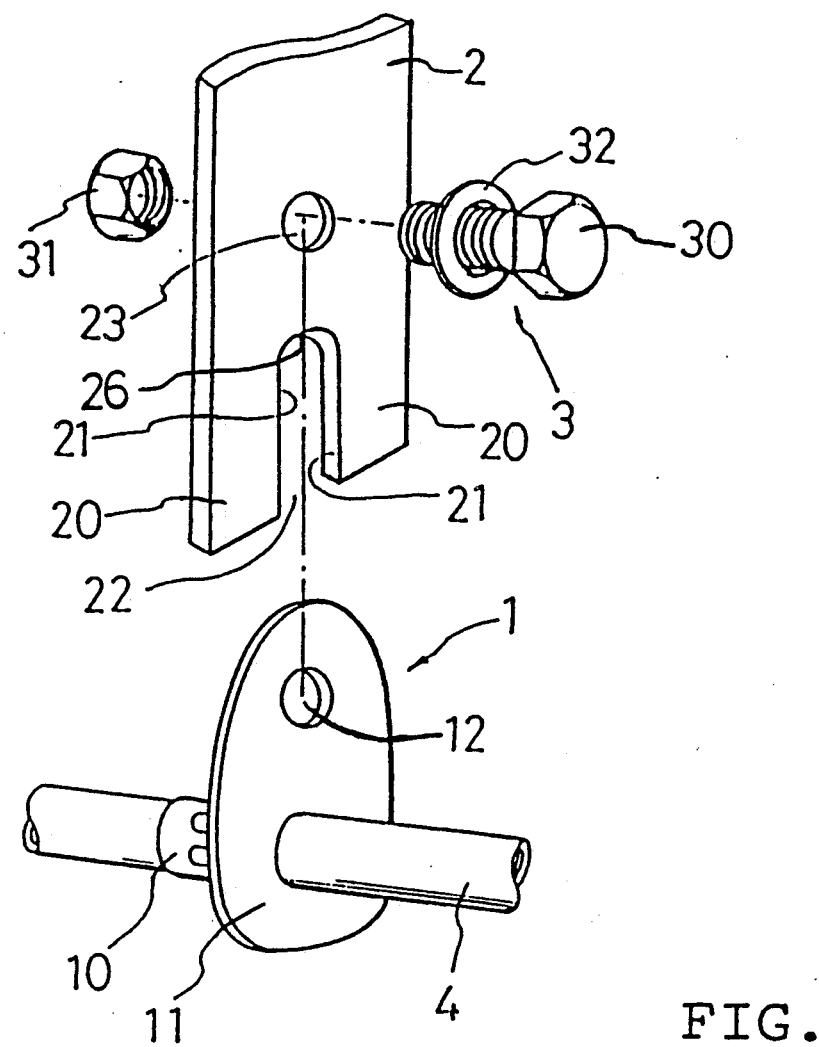
FIG. 1 is a partially exploded perspective view illustrating a hose fitting fixing construction of a first preferred embodiment according to the present invention.
Figure 2:
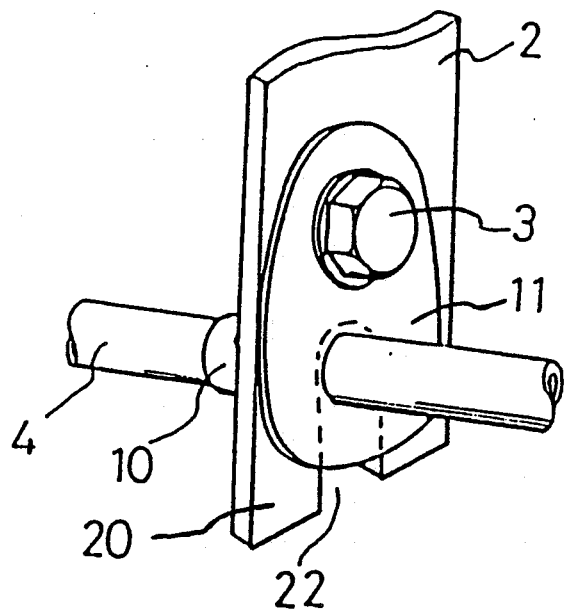
FIG. 2 is a perspective view illustrating an assembly of the hose fitting fixing construction illustrated in FIG. 1.

FIGS. 1 and 2 show a hose fitting fixing construction of the first preferred embodiment according to the present invention.

The hose fitting fixing construction comprises a hose fitting 1 comprising a tubular sleeve 10 into which a hose 4 is inserted and a tongue-shaped plate flange 11 which extends from an outer peripheral surface of the sleeve 10 in a radial direction, a plate bracket 2 extending from a mounting portion of an automobile, and a fixing means 3 comprising a bolt 30, a nut 31 and a washer 32.

In the hose fitting 1, the sleeve 10 and the flange 11 are formed integrally, and the hose 4 is fixed in the hose fitting 1 by crimping at the outer peripheral surface of the sleeve 10. A bolt hole 12 into which the bolt 30 is inserted is drilled through in the flange 11.

Stoppers 20, 20 projecting and extending toward the both sides of the sleeve 10 are formed at the end of the bracket 2. Surfaces of the stoppers 20, 20 facing each other are first stopper surfaces 21, 21. That is, a cut-off 22, having a width approximately equal to the outer diameter of the sleeve 10, is formed at the end of the bracket 2, and inner surfaces of the cut-off 22 are the first stopper surfaces 21, 21. The top surface of the cut-off 22 at a middle portion of the bracket 2 is a second stopper surface 26. Further, a bolt hole 23 into which the bolt 30 is inserted is drilled through in the bracket 2 at an upper portion of the bracket 2.

The constituent members thus arranged are assembled in the following manner:

The hose 4 is inserted into the hose fitting 1, and they are assembled by crimping at the outer peripheral surface of the sleeve 10. Then, the sleeve 10 is inserted into the cut-off 22, and the flange 11 and the bracket 2 are overlapped so that the bolt hole 12 of the flange 11 and the bolt hole 23 of the bracket 2 are aligned. Finally, the hose fitting 1 and the bracket 2 are fixed with the bolt 30, the washer 32 and the nut 31.

In the hose fitting fixing construction of this preferred embodiment, when the flange 11 of the hose fitting 1 and the bracket 2 are assembled, the sleeve 10 of the hose fitting 1 is guided on the first stopper surfaces 21, 21 of the stopper 20 until it is brought into contact with the second-stopper surface 26. Thus, it is possible to position a hose assembly comprising the hose 4 and the hose fitting 1 with respect to an automobile body with ease. Further, if fixing force of the fixing means 3 diminishes during service, rotation of the hose fitting 1 with respect to the bracket 2 is prevented by the first stopper surfaces 21, 21, and thus it is possible to prevent the hose assembly comprising the hose 4 and the hose fitting 1 from displacing from the installed position. Furthermore, the cut-off 22, i.e., the stoppers 20, 20 and the stopper surfaces 21, 21 and 26, are formed simultaneously when forming the bracket 2 by pressing. Accordingly, it is possible to minimize the number of the production processes and the material loss.

Second Preferred Embodiment

Figure 3:
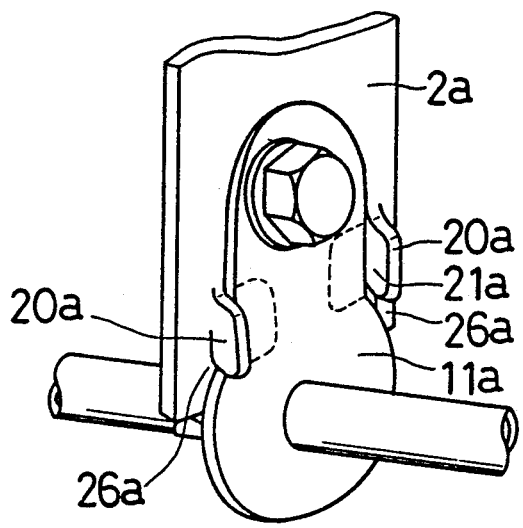
FIG. 3 is a perspective view of a hose fitting fixing construction of a second preferred embodiment according to the present invention.

FIG. 3 shows a hose fitting fixing construction of the second preferred embodiment according to the present invention.

In the hose fitting fixing construction of the second preferred embodiment, a flange 11a of the hose fitting 1 has a pear shape. A bracket 2a is cut in a U-shape at two portions, and the cut two portions are bent and erected so as to face each other and so as to extend from the surface of the bracket 2a toward the flange 11a. Two stoppers 20a, 20a are thus made. Other than the two stoppers 20a, 20a, the hose fitting fixing construction of the second preferred embodiment has the same arrangement as that of the first preferred embodiment. In this preferred embodiment, surfaces of the stoppers 20a, 20a facing each other are first stopper surfaces 21a, 21a, and bottom surfaces of the stoppers 20a, 20a are second stopper surfaces 26a, 26a.

The hose fitting fixing construction of the second preferred embodiment allows a positioning accuracy of the flange 11a with respect to the bracket 2a as good as the positioning accuracy allowed by the first preferred embodiment. The first stopper surfaces 21a, 21a and the second stopper surfaces 26a, 26a guide and position the flange 11a well. That is, an operator can easily tell the completion of the positioning of the flange 11a with respect to the bracket 2a by the contact of the stoppers 20a, 20a with the flange 11a lower portion having an increased diameter. Further, the first stopper surfaces 21a, 21a similarly prevent the hose fitting 1 from rotating on the bracket 2a. Furthermore, the material loss is less because the stoppers 20a, 20a are formed only by cutting, bending and erecting the bracket 2a at the two portions.

Third Preferred Embodiment

Figure 4:
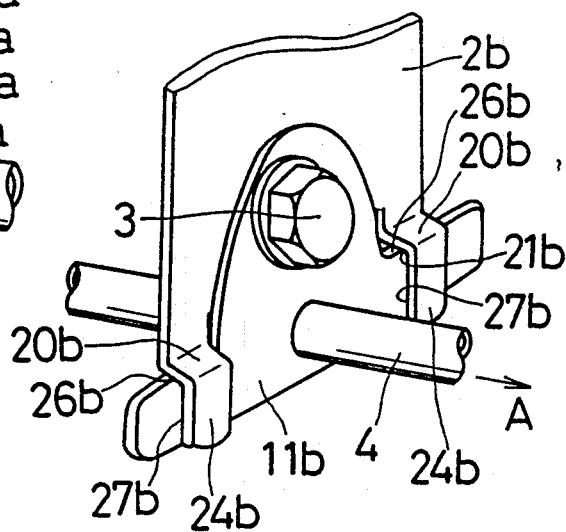
FIG. 4 is a perspective view of a hose fitting fixing construction of a third preferred embodiment according to the present invention.

The third preferred embodiment according to the present invention shown in FIG. 4 is a modification of the hose fitting fixing construction of the first preferred embodiment.

In this third preferred embodiment, lower portion of a flange 11b of the hose fitting 1 is formed in a rectangle shape and upper portion of the flange 11b is formed in a half oval shape. The rectangle-shaped lower portion of the flange 11b extends in the horizontal direction. Holding portions 24b, 24b are formed first by bending the ends of two stoppers 20b, 20b of a bracket 2b substantially perpendicularly to the flange 11b and then by bending the perpendicularly bent ends substantially parallelly to the flange 11b. Side surfaces of the stoppers 20b, 20b facing each other are first stopper surfaces 21b, 21b, and rear surfaces of the stoppers 20b, 20b opposite to a surface of the bracket 2b to be overlapped on the oval-shaped upper portion of the flange 11b are second stopper surfaces 26b, 26b and third stopper surfaces 27b, 27b. Namely, the second stopper surfaces 26b, 26b and the third stopper surfaces 27b, 27b respectively contact with the top and side surface of the rectangle-shaped lower portion of the flange 11b.

In the hose fitting fixing construction of the third preferred embodiment, the first stopper surfaces 21b, 21b and the second stopper surfaces 26b, 26b position the flange 11b of the hose fitting 1 with respect to the bracket 2b and prevent the hose fitting 1 from rotating on the bracket 2b in a manner similar to that of the hose fitting fixing construction of the first preferred embodiment. In addition, when an overload due to the icing is exerted on the hose 4 in the axial direction (the direction of an arrow A) of the hose 4, it is possible to prevent the stress from concentrating on the portion fixed with the fixing means 3 because the third stopper surfaces 27b, 27b of the holding portions 24b, 24b restricts the movement of the flange 11b in the direction of the arrow A.

Fourth Preferred Embodiment

Figure 5:
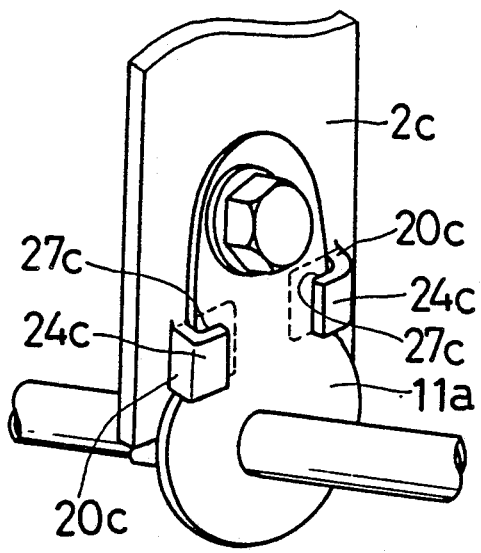
FIG. 5 is a perspective view of a hose fitting fixing construction of a fourth preferred embodiment according to the present invention.

A fourth preferred embodiment according to the present invention shown in FIG. 5 is a modification of the hose fitting fixing construction of the second preferred embodiment.

In the hose fitting fixing construction of the fourth preferred embodiment, holding portions 24c, 24c are formed by further bending the ends of the two stoppers 20a, 20a of the bracket 2a of the second preferred embodiment inwardly in a substantially perpendicular manner. The inner surfaces of the holding portions 24c, 24c are third stopper surfaces 27c, 27c. The stopper surfaces 27c, 27c contact with a surface of the flange 11a opposite to the surface thereof to be brought into contact with the bracket 2C, and hold lower ends of the upper portion of the flange 11a. Before forming the two holding portions 24c, 24c, the inner surfaces of the holding portions 24c, 24c have been the surface of the bracket 2c opposite to the surface thereof to be overlapped on the upper portion of the flange 11a.

The hose fitting fixing construction of the fourth preferred embodiment works and effects advantages in a manner similar to the second preferred embodiment as well as the third preferred embodiment. That is, the hose fitting fixing construction of the fourth preferred embodiment can also prevent the stress concentration on the portion fixed with the fixing means 3 when an overload is exerted on the hose 4 in the axial direction.

Fifth Preferred Embodiment

Figure 6:
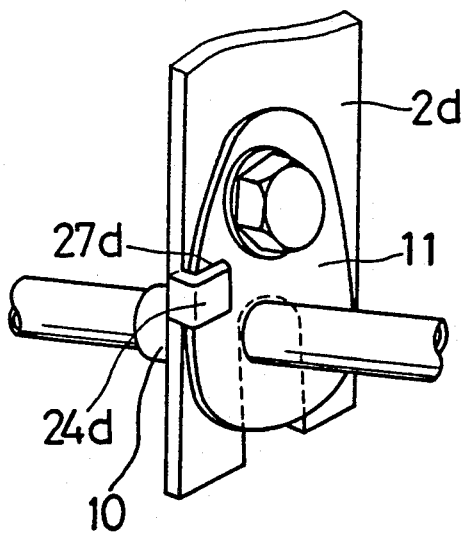
FIG. 6 is a perspective view of a hose fitting fixing construction of fifth preferred embodiment according to the present invention.

A hose fitting fixing construction of the fifth preferred embodiment shown in FIG. 6 has a holding portion 24d extending from a side surface of a bracket 2d and formed in an L-shape or U-shape. The inner surface of the holding portion 24d is a third stopper surface 27d, and contacts with a surface of the flange 11 opposite to a surface thereof brought into contact with the bracket 2d. Namely, the third stopper surface 27d contacts with the surface of the flange 11 disposed opposite to the sleeve 10. Except the holding portion 24d, the hose fitting fixing construction of the fifth preferred embodiment has the same arrangements as those of the first preferred embodiment. The hose fitting fixing construction of the fifth preferred embodiment works and effects advantages similarly to the first and third preferred embodiments.

Sixth Preferred Embodiment

Figure 7:
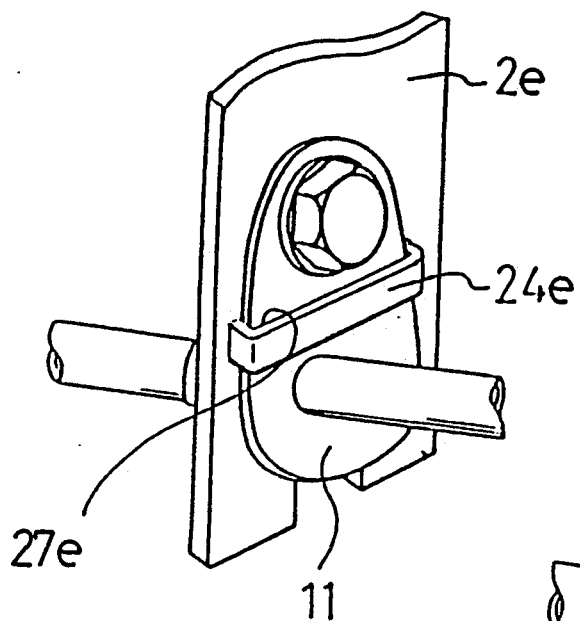
FIG. 7 is a perspective view of a hose fitting fixing construction of a sixth preferred embodiment according to the present invention.

The sixth preferred embodiment of the present invention shown in FIG. 7 is a modification of the fifth preferred embodiment.

The hose fitting fixing construction of the sixth preferred embodiment has a band-shaped holding portion 24e formed integrally with a bracket 2e. The band-shaped holding portion 24e projects from a surface of the bracket 2e in a substantially perpendicular manner, extends in a substantially parallel manner to the surface of the bracket 2e, and returns to the surface of the bracket 2e in a substantially perpendicular manner. The holding portion 24e is thus formed integrally with the bracket 2e. The inner surface of the band-shaped holding portion 24e is a third stopper surface 27e. The hose fitting fixing construction of the sixth preferred embodiment works and effects advantages similarly to the first and third preferred embodiments.

Seventh Preferred Embodiment

Figure 8:
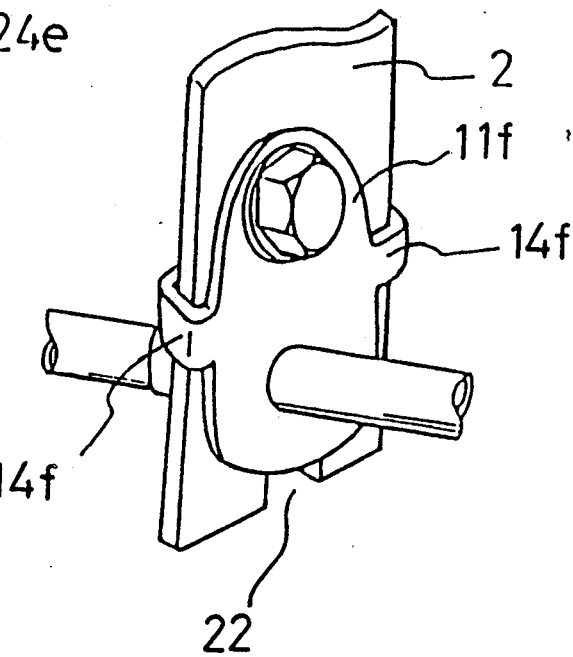
FIG. 8 is a perspective view of a hose fitting fixing construction of a seventh preferred embodiment according to the present invention.

A hose fitting fixing construction of the seventh preferred embodiment shown in FIG. 8 has two U-shaped holding portion 14f, 14f projecting from both sides of a flange 11f. These U-shaped holding portions 14f, 14f may be formed in an L-shape. As described in the first preferred embodiment, the bracket 2 of the hose fitting fixing construction of this preferred embodiment has the cut-off 22 which forms the stopper 20 having the first stopper surfaces 21, 21 and the second stopper surface 26.

Eighth Preferred Embodiment

Figure 9:
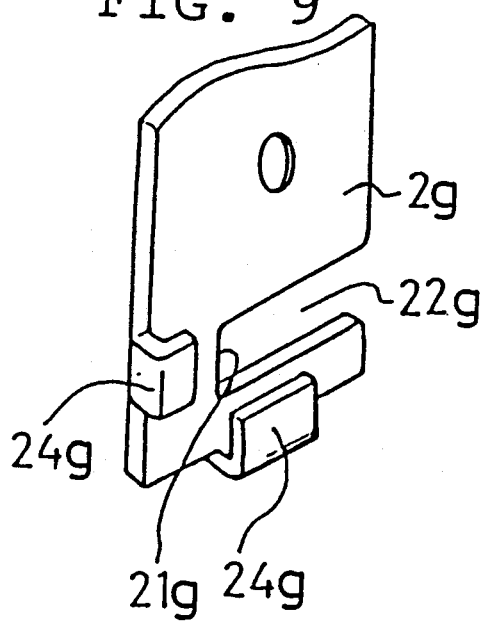
FIG. 9 is a perspective view of a bracket of a hose fitting fixing construction of an eighth preferred embodiment to the present invention.

FIG. 9 shows another embodiment of the bracket 2. As illustrated in the figure, a cut-off 22g may be formed at a side end of a bracket 2g, not at a lower end thereof. In addition, holding portions 24g, 24g may be formed at a lower end of the bracket 2g and a side end thereof. In this preferred embodiment, the bottom surface of the cut-off 22g is a first stopper surface 21g.

Ninth Preferred Embodiment

Figure 10:
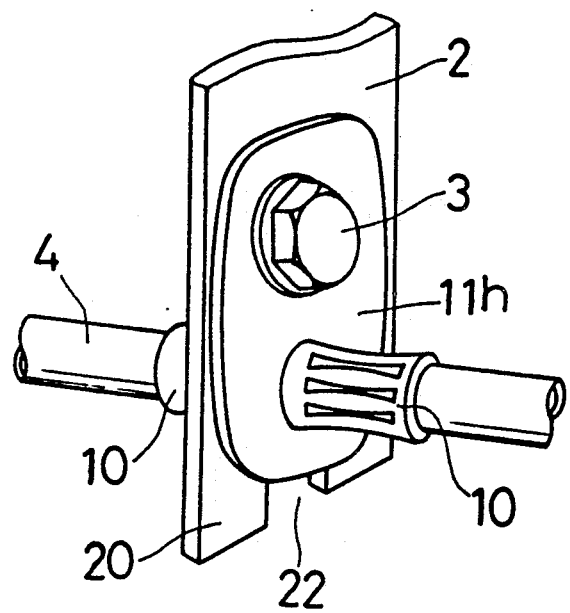
FIG. 10 is a perspective view of a hose fitting fixing construction of a ninth preferred embodiment according to the present invention.

FIG. 10 shows a hose fitting fixing construction of the ninth preferred embodiment. This preferred embodiment is an application of the hose fitting fixing construction of the first preferred embodiment to a hose fitting having an oval-shaped plate flange 11h and two sleeves 10, 10 disposed on both sides of the oval-shaped plate flange 11h. The operation and advantages of this preferred embodiment will not be described, as they are identical with those of the first preferred embodiment except the hose fitting.

Tenth Preferred Embodiment

Figure 11:
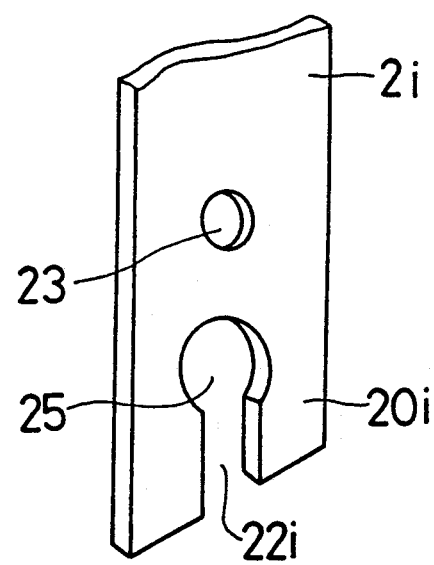
FIG. 11 is a perspective view of a bracket of a hose fitting fixing construction of a tenth preferred embodiment according to the present invention.

FIG. 11 shows a still another embodiment of the bracket 2. A bracket 2i of this preferred embodiment has a sleeve holding hole 25 formed at the inner end of a cut-off 22i. The cut-off 22i has a width smaller than the outer diameter of the sleeve 10 and approximately equal to the outer diameter of the hose 4. The inner diameter of the sleeve holding hole 25 is approximately equal to the outer diameter of the sleeve 10.

When installing the hose fitting 1 to the bracket 2i, the hose 4 is inserted into the sleeve holding hole 25 by way of the cut-off 22i. Then, the hose is moved in its longitudinal direction to engage the sleeve 10 with the sleeve holding hole 25.

In the hose fitting fixing construction of this preferred embodiment, the inner diameter of the sleeve holding hole 25 is approximately equal to the outer diameter of the sleeve 10, thereby engaging the sleeve 10 with the sleeve holding hole 25. Accordingly, it is possible to fix the hose fitting 1 at a predetermined position in the bracket 2i without inserting the bolt 30 into the bolt hole 23 and fixing the hose fitting 1 with the fixing means 3 comprising the bolt 30 and nut 31. Further, when the fixing means 3 has loosened, the hose fitting 1 hardly gets rickety.

Furthermore, the inner diameter of the sleeve holding hole 25 may not necessarily be approximately equal to the outer diameter of the sleeve 10. Namely, the sleeve holding hole 25 may be in any form as far as it admits the sleeve 10 therein but it does not admit the flange 11 therein. Moreover, the cut-off 22i of the bracket 2i may not be extended in a straight manner but in a curved manner.

What is claimed is:

1. A hose fitting fixing construction comprising:
   a hose fitting comprising a tubular sleeve into which a hose is inserted and a plate flange into which a hose is inserted and a plate flange extending from an outer peripheral surface of said sleeve in a radial direction of said sleeve;
   a plate bracket extending from a mounting portion; and a fixing means for fixing said flange and said bracket in an overlapped state, said fixing means being separate from said tubular sleeve and hose; wherein said bracket has at least one stopper having a first stopper surface in contact with said hose fitting and being substantially parallel to a plane which contains a fixing point of said fixing means and a central axis of said sleeve of said hose fitting for preventing said hose fitting from moving on a surface of said bracket.

2. A hose fitting fixing construction according to claim 1, wherein said stopper has a second stopper surface brought into contact with said hose fitting when said hose fitting and said bracket are fixed and being substantially perpendicular to said plane.

3. A hose fitting fixing construction according to claim 1 or claim 2, wherein said stopper further comprises a leg portion extending from an end of said bracket and forming a cut-off having a width approximately equal to the outer diameter of said sleeve.

4. A hose fitting fixing construction according to claim 2, wherein said stopper further comprises a leg portion extending from an end of said bracket and forming a cutoff having an opening with a width smaller than the outer diameter of said sleeve and approximately equal to the outer diameter of said hose at one end and a sleeve holding hole with an inner diameter approximately equal to the outer diameter of said sleeve at the other end.

5. A hose fitting fixing construction according to claim 1, wherein said stopper further comprises two projecting portions projecting from at least one of said flange and said bracket and disposed at a distance approximately equal to a width of said hose fitting when said flange and said bracket are fixed.

6. A hose fitting fixing construction according to claim 5, wherein said stopper further comprises a holding portion having two projecting portions bent substantially perpendicularly at ends comprising third stopper surfaces brought into contact with a surface opposite to a mating surface of said hose fitting.

7. A hose fitting fixing construction according to claim 1 or claim 2, wherein said stopper further comprises;
a leg portion extending from an end of said bracket and forming a cut-off having a width approximately equal to the outer diameter of said sleeve; and
a holding portion having at least one projecting portion projecting substantially perpendicularly from at least one of a mating surface of said flange and said bracket, an end bent substantially perpendicularly and a third stopper surface brought into contact with a surface opposite to a mating surface of said hose fitting.

8. A hose fitting fixing construction according to claim 2, wherein said stopper further comprises;
a leg portion extending from an end of said bracket and forming a cut-off having an opening with a width smaller than the outer diameter of said sleeve and approximately equal to the outer diameter of said hose at one end, and a sleeve holding hole with an inner diameter approximately equal t the outer diameter of said sleeve at the other end; and
a holding portion having at least one projecting portion projecting substantially perpendicularly from at least one of a mating surface of said flange and said bracket, an end bent substantially perpendicularly and a third stopper surface brought into contact with a surface- opposite to a mating surface of said hose fitting.

9. A hose fitting fixing construction according to claim 2, wherein said stopper comprises two projecting portions projecting substantially perpendicularly from a mating surface of said bracket and disposed at a distance approximately equal to a width of said flange when said flange and said bracket are fixed, and said flange has a swollen portion brought into contact with said second stopper surface of said stopper when said flange and said bracket are fixed.

10. A hose fitting fixing construction according to claim 9, wherein said stopper further comprises holding portions formed by bending ends of said projecting portions substantially perpendicularly and having third stopper surfaces brought into contact with a surface opposite to a mating surface of said flange.

11. A hose fitting fixing construction according to claim 9 or claim 10, wherein said flange has a tapered portion brought into contact with said second stopper surface of said stopper when said flange and said bracket are fixed.

12. A hose fitting fixing construction according to claim 1, wherein said stopper further comprises a band-shaped portion projecting substantially perpendicularly from a mating surface of one of said flange and said bracket and having a first stopper surface brought into contact with both sides of said hose fitting in a manner going around said hose fitting and a third stopper surface brought into contact with a surface opposite to a mating surface of said hose fitting when said flange and said bracket are fixed.

13. A hose fitting fixing construction according to claim 2, wherein said stopper is a band-shaped portion projecting substantially perpendicularly from a mating surface of said bracket and having a first stopper surface and a second stopper surface brought into contact with both sides of said flange and a third stopper surface brought into contact with a surface opposite to a mating surface of said flange when said flange and said bracket are fixed, and said flange has a swollen portion brought into contact with said second stopper surface of said stopper when said flange and said bracket are fixed.

14. A hose fitting fixing construction according to claim 13, wherein said flange has a tapered portion brought into contact with said second stopper surface of said stopper when said flange and said bracket are fixed.

* * * * *